(12) United States Patent
Kim et al.

(10) Patent No.: US 11,519,636 B2
(45) Date of Patent: Dec. 6, 2022

(54) CONDENSATE WATER TRAP FOR GAS FURNACE

(71) Applicant: LG ELECTRONICS INC., Seoul (KR)

(72) Inventors: Jusu Kim, Seoul (KR); Doyong Ha, Seoul (KR); Yongki Jeong, Seoul (KR); Janghee Park, Seoul (KR); Hansaem Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 210 days.

(21) Appl. No.: 16/940,632

(22) Filed: Jul. 28, 2020

(65) Prior Publication Data

US 2021/0033306 A1 Feb. 4, 2021

(30) Foreign Application Priority Data

Jul. 30, 2019 (KR) .................. 10-2019-0092707

(51) Int. Cl.
*F24H 8/00* (2022.01)
*F24H 3/00* (2022.01)

(52) U.S. Cl.
CPC .............. *F24H 8/00* (2013.01); *F24H 3/006* (2013.01)

(58) Field of Classification Search
None
See application file for complete search history.

(56) References Cited

U.S. PATENT DOCUMENTS

2009/0229539 A1\* 9/2009 Young .................. F16T 1/34
122/14.1
2012/0090601 A1\* 4/2012 Goundiah Ramasamy ..................
F24H 8/006
126/85 R \* cited by examiner

*Primary Examiner* — Jason Lau
(74) *Attorney, Agent, or Firm* — KED & Associates

(57) ABSTRACT

Provided is a condensate water trap for a gas furnace that collects and discharges condensate water produced in a heat exchanger and an exhaust pipe. The condensate water trap includes: a first inlet through which the condensate water produced in the heat exchanger is introduced; a second inlet through which the condensate water produced in the exhaust pipe is introduced; a first flow path through which the condensate water coming from the first inlet passes; a second flow path through which the condensate water coming from the second inlet passes; an outlet through which the condensate water introduced through the first and second inlets is discharged; a third flow path into which the residual condensate water passed through at least one of the first and second flow paths but not discharged through the outlet is introduced; and a sensing mechanism that senses if the amount of residual condensate water introduced into the third flow path is greater than or equal to a given amount.

11 Claims, 8 Drawing Sheets

CONDENSATE WATER TRAP FOR GAS FURNACE

CROSS-REFERENCE TO RELATED APPLICATION

This application claims the priority from Korean Patent Application No. 10-2019-0092707, filed on Jul. 30, 2019, in the Korean Intellectual Property Office, the disclosure of which is incorporated herein by reference in its entirety.

FIELD OF THE DISCLOSURE

The present disclosure relates to a condensate water trap for a gas furnace. More particularly, the present disclosure relates to a condensate water trap for a gas furnace that can detect if collected condensate water produced in a heat exchanger and exhaust pipe of the gas furnace is stopped from escaping due to blockage of an outlet.

RELATED ART

Generally, a gas furnace is an apparatus that heats up a room by supplying air heated through heat exchange with a flame and high-temperature combustion gas produced by the combustion of a fuel gas.

The gas furnace requires a condensate water trap for a gas furnace which collects and discharges condensate water produced in a heat exchanger and an exhaust pipe.

A problem with a condensate water trap for a gas furnace according to the related art is condensate water stagnation, in which condensate water is stopped from escaping due to foreign material clogging a drainage pipe connected to an outlet.

Even in the face of this problem, there is still a lack of development of condensate water traps for gas furnaces that come with a component or means for detecting pipe blockage.

SUMMARY OF THE DISCLOSURE

A first problem to be solved by the present disclosure is to provide a condensate water trap for a gas furnace that can detect if collected condensate water is stagnating and stopped from escaping due to blockage of a drainage pipe connected to an outlet.

A second problem to be solved by the present disclosure is to provide a condensate water trap for a gas furnace that can minimize design change points and detect if condensate water is stagnating and stopped from escaping.

Technical problems to be solved by the present disclosure are not limited to the above-mentioned technical problems, and other technical problems not mentioned herein may be clearly understood by those skilled in the art from description below.

The present invention relates to a condensate water trap for a gas furnace that collects and discharges condensate water produced in a heat exchanger and an exhaust pipe.

To solve the above-mentioned problems, there is provided a condensate water trap for a gas furnace according to the present disclosure, the condensate water trap including: a first inlet through which the condensate water produced in the heat exchanger is introduced; a second inlet through which the condensate water produced in the exhaust pipe is introduced; a first flow path through which the condensate water coming from the first inlet passes; a second flow path through which the condensate water coming from the second inlet passes; an outlet through which the condensate water introduced through the first and second inlets is discharged; a third flow path into which the residual condensate water passed through at least one of the first and second flow paths but not discharged through the outlet is introduced; and a sensing mechanism that senses if the amount of residual condensate water introduced into the third flow path is greater than or equal to a given amount.

The sensing mechanism may further include: a float housing disposed on the third flow path and having a housing hole formed in one side through which the residual condensate water passes; a float accommodated inside the float housing and configured to float when the residual condensate water enters the float housing through the housing hole; and a sensor for sensing the degree of floating of the float.

Means for solving other problems not mentioned above will be easily deduced from the descriptions of embodiments of the present disclosure.

DESCRIPTION OF EXEMPLARY EMBODIMENTS

Figure 1:
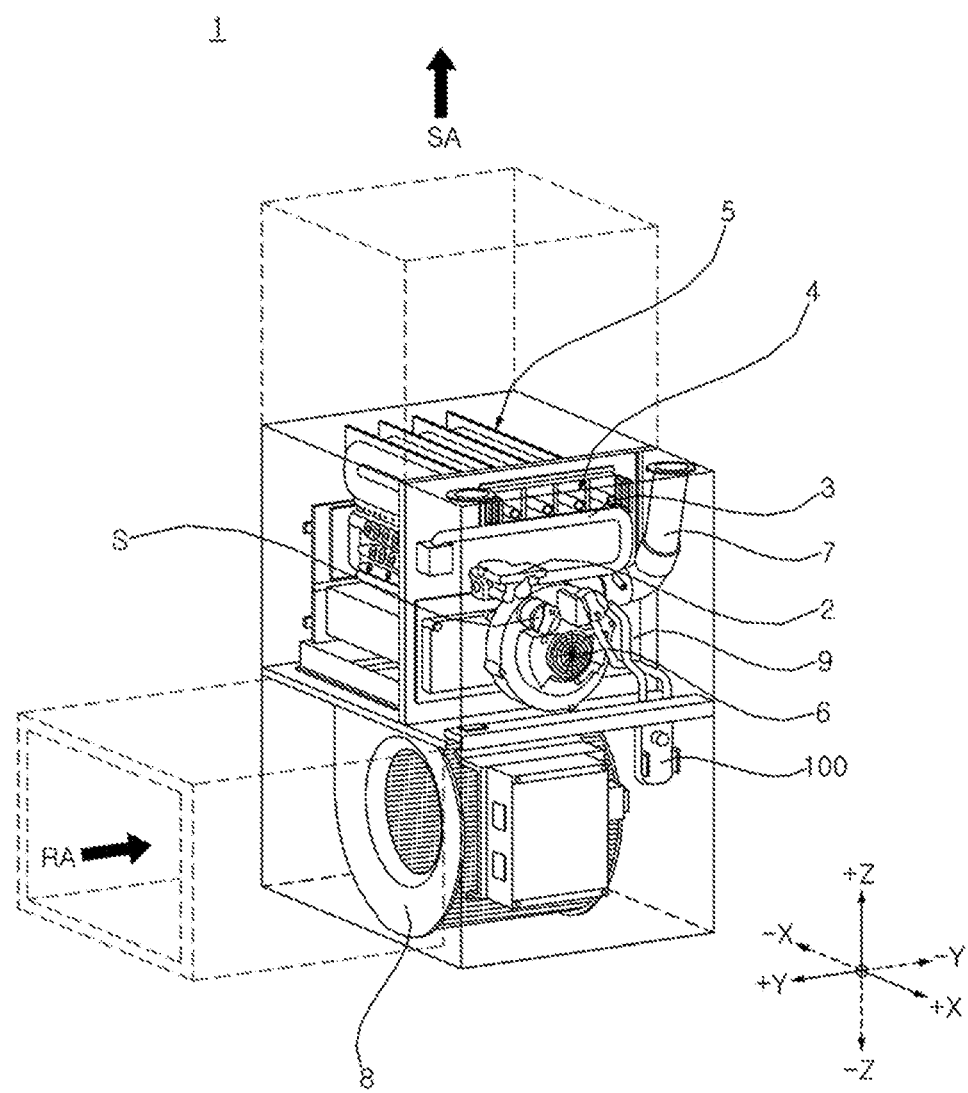
FIG. 1 is a perspective view of a gas furnace equipped with a condensate water trap for a gas furnace according to an exemplary embodiment of the present disclosure.

Advantages and features of the present disclosure and methods for achieving them will be made clear from embodiments described below in detail with reference to the accompanying drawings. The present disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. The present disclosure is merely defined by the scope of the claims. Like reference numerals refer to like elements throughout the specification.

The present disclosure will be described with respect to a spatial orthogonal coordinate system illustrated in FIG. 1 and other figures where X, Y, and Z axes are orthogonal to each other. In this specification, the X axis, Y axis, and Z axis are defined assuming that the up-down direction is along the Z axis and the front-back direction is along the X axis. Each axis direction (X-axis direction, Y-axis direction, and Z-axis direction) refers to two directions in which each axis runs. Each axis direction with a '+' sign in front of it (+X-axis direction, +Y-axis direction, and +Z-axis direction) refers to a positive direction which is one of the two directions in which each axis runs. Each axis direction with a '−' sign in front of it (−X-axis direction, −Y-axis direction, and −Z-axis direction) refers to a negative direction which is the other of the two directions in which each axis runs.

Hereinafter, a gas furnace equipped with a condensate water trap for a gas furnace according to an exemplary embodiment of the present disclosure will be described with reference to FIG. 1.

FIG. 1 is a perspective view of a gas furnace equipped with a condensate water trap for a gas furnace according to an exemplary embodiment of the present disclosure.

Generally, a gas furnace is an apparatus that heats up a room by supplying air heated through heat exchange with a flame and high-temperature combustion gas P produced by the combustion of a fuel gas R.

Referring to FIG. 1, the gas furnace 1 according to the exemplary embodiment of the present disclosure includes a gas valve 2 that supplies a fuel gas R to a manifold 3, a burner 4 in which the fuel gas R released from the manifold 3 is mixed with air and flows in an air-fuel mixture, and a heat exchanger 5 through which a combustion gas P produced by the combustion of the air-fuel mixture in the burner 4 flows.

Furthermore, the gas furnace 1 include an inducer 6 for inducing a flow of combustion gas P to an exhaust pipe 7 through the heat exchanger 5, a blower 8 for blowing air around the heat exchanger 5 so that the air is supplied to a room, and a condensate water trap 100 for collecting condensate water produced in the heat exchanger 5 and/or the exhaust pipe 7 and discharging it.

The fuel gas R supplied through the gas valve 2 may include, for example, liquefied natural gas (LNG), which is natural gas that has been cooled down to liquid form, or liquefied petroleum gas (LPG), which is prepared by pressurizing gaseous by-products of petroleum refining into liquid form.

As the gas valve 2 opens or closes, the fuel gas R may be supplied to the manifold 3 or its supply may be cut off. Also, the amount of fuel gas R supplied to the manifold 3 may be regulated by adjusting the opening degree of the gas valve 2. As such, the gas valve 2 may regulate the heating power of the gas furnace 1. To this end, the gas furnace 1 may further include a controller for adjusting the opening or closing of the gas valve 2 or its opening degree.

The manifold 3 may guide the fuel gas R to the burner 4, and the fuel gas R, once introduced into the burner 4, may flow in a mixture with air.

The air-fuel mixture flowing through the burner 4 may be burnt due to flame ignition by an igniter. In this case, the combustion of the air-fuel mixture may produce a flame and a high-temperature combustion gas P.

The heat exchanger 5 may have a flow path through which the combustion gas P can flow.

Although the gas furnace 1 according to the exemplary embodiment of the present disclosure will be described hereinafter as including a heat exchanger 5 including a primary heat exchanger and a secondary heat exchanger which are to be described later, only the primary heat exchanger may be provided in some embodiments.

The primary heat exchanger may be placed with one end being adjacent to the burner 4. The other end of the primary heat exchanger opposite the one end may be attached to a coupling box. The combustion gas P flowing from one end of the primary heat exchanger to the other end may be conveyed to the secondary heat exchanger via the coupling box.

One end of the secondary heat exchanger may be connected to the coupling box. The combustion gas P, once passed through the primary heat exchanger, may be introduced into one end of the secondary heat exchanger and pass through the secondary heat exchanger.

The secondary heat exchanger may allow the combustion gas P passed through the primary heat exchanger to exchange heat with the air passing around the secondary heat exchanger. That is, the thermal energy of the combustion gas P passed through the primary heat exchanger through the secondary heat exchanger may be additionally used, thereby improving the efficiency of the gas furnace 1.

The combustion gas P passed through the secondary heat exchanger may condense through heat transfer to the air passing around the secondary heat exchanger, thereby producing a condensate. In other words, the vapor contained in the combustion gas P may condense and turn into condensate.

Due to this reason, the gas furnace 1 equipped with the primary heat exchanger and secondary heat exchanger is also called a condensing gas furnace. The produced condensate may be collected in a condensate collecting portion 9. To this end, the other end of the secondary heat exchanger opposite the one end may be connected to one side of the condensate collecting portion 9.

An inducer 6 may be attached to the other side of the condensate collecting portion 9. Although the inducer 6 is described as being attached to the condensate collecting portion 9 for ease of explanation, the inducer 6 also may be attached to a mounting panel to which the condensate collecting portion 9 is attached.

The condensate collecting portion 9 may have an opening formed in it. The other end of the secondary heat exchanger and the inducer 6 may communicate with each other via the opening formed in the condensate collecting portion 9. That is, the combustion gas P passed through the other end of the secondary heat exchanger may be released to the inducer 6 through the opening formed in the condensate collecting portion 9 and then discharged out of the gas furnace 1 through the exhaust pipe 7.

The condensate produced in the secondary heat exchanger may be released to the condensate water trap 100 through the condensate collecting portion 9 and then discharged out of the gas furnace 1 through an outlet.

As shown in FIG. 1, the condensate water trap 100 may collect and discharge the condensate produced in the exhaust pipe 7 connected to the inducer 6, as well as the condensate produced in the secondary heat exchanger. That is, even a combustion gas P not condensed at the other end of the secondary heat exchanger may condense to form a condensate as it passes through the exhaust pipe 7, then collect at the condensate water trap 100, and then be discharged out of the gas furnace 1 through the outlet.

The inducer 6 may communicate with the other end of the secondary heat exchanger via the opening formed in the condensate collecting portion 9. One end of the inducer 6 may be attached to the other side of the condensate collecting portion 9, and the other end of the inducer 6 may be attached to the exhaust pipe 7.

The inducer 6 may induce a flow of combustion gas P that passes through the primary heat exchanger, coupling box, and secondary heat exchanger and is discharged to the exhaust pipe 7. In this regard, the inducer 6 may be understood as an induced draft motor (IDM).

The blower 8 for the gas furnace may be located at the bottom of the gas furnace 1. Air supplied to the room may move upward from the bottom of the gas furnace 1 by the blower 8. In this regard, the blower 8 may be understood as an indoor blower motor (IBM).

The blower 8 may allow air to pass around the heat exchanger 5. The air passing around the heat exchanger 5, blown by the blower 8, may have a temperature rise by receiving thermal energy from the high-temperature combustion gas P via the heat exchanger 5. The room may be heated as the higher-temperature air is supplied to the room.

The gas furnace 1 according to the exemplary embodiment of the present disclosure may include a casing. The components of the above-described gas furnace 1 may be accommodated inside the casing.

A lower opening may be formed in a side adjacent to the blower 8, at the bottom of the casing. A room air duct D1 through which air (hereinafter, "room air") RA coming from a room passes may be installed in the lower opening.

A supply air duct D2 through which air (hereinafter, "supply air") SA supplied to the room passes may be installed in an upper opening formed at the top of the casing. That is, when the blower 8 operates, the air coming from the room through the room air duct D1 to be used as the room air RA has a temperature rise as it passes through the heat exchanger 5, and the air may be supplied into the room through the supply air duct D2 and used as the supply air SA, thereby heating the room.

Figure 2:
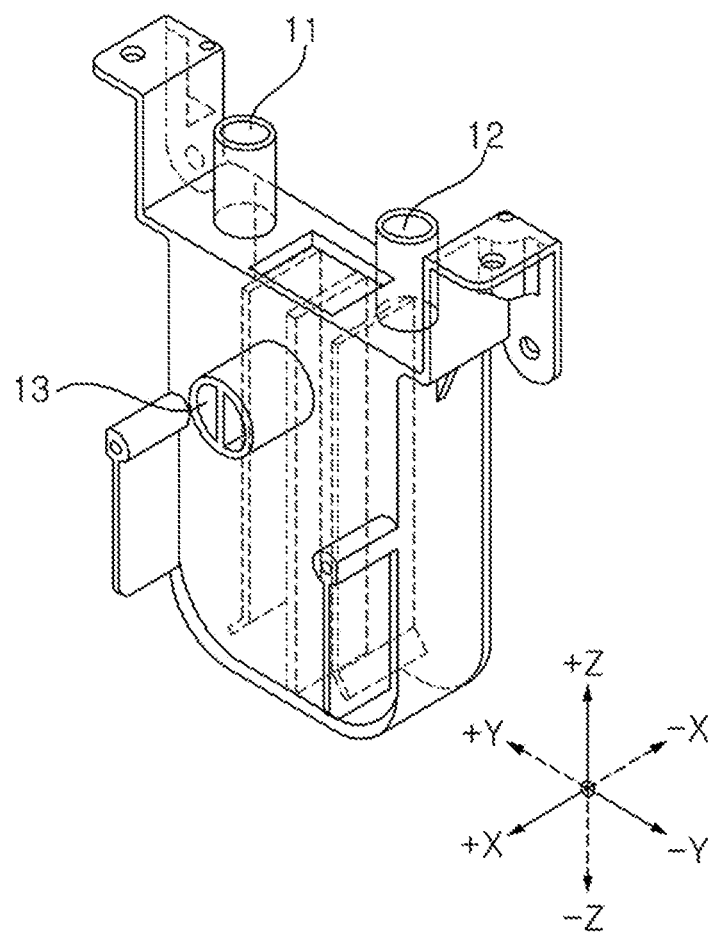
FIG. 2 is a perspective view of a condensate water trap for a gas furnace according to the related art.

FIG. 2 is a perspective view of a condensate water trap for a gas furnace according to the related art.

Referring to FIG. 2, condensate water produced in the heat exchanger and condensate water produced in the exhaust pipe may be collected in the condensate water trap according to the related art, through a first inlet 11 and a second inlet 12, respectively.

However, the condensate water trap 10 according to the related art has no means or component for detecting if the condensate water is stopped from escaping due to blockage of a drainage pipe connected to an outlet 13. As a result, a pipe blockage occurs, which means that it will take a considerable amount of time for a user to become aware of any buildup of the condensate water in the heat exchanger and exhaust pipe.

Moreover, condensate water accumulated in the heat exchanger 5 and exhaust pipe 7 will freeze in cold weather, which can cause a significant drop in heating efficiency and severe damage to the components of the gas furnace including the heat exchanger 5 and the exhaust pipe 7.

In view of this, the present disclosure has been devised to provide a condensate water trap 100 for detecting if condensate water collected in the condensate water trap 100 is stagnating and stopped from escaping due to pipe blockage.

Hereinafter, referring to FIGS. 1 to 8, a condensate water trap for a gas furnace according to an exemplary embodiment of the present disclosure will be described in more concrete details.

Figure 3:
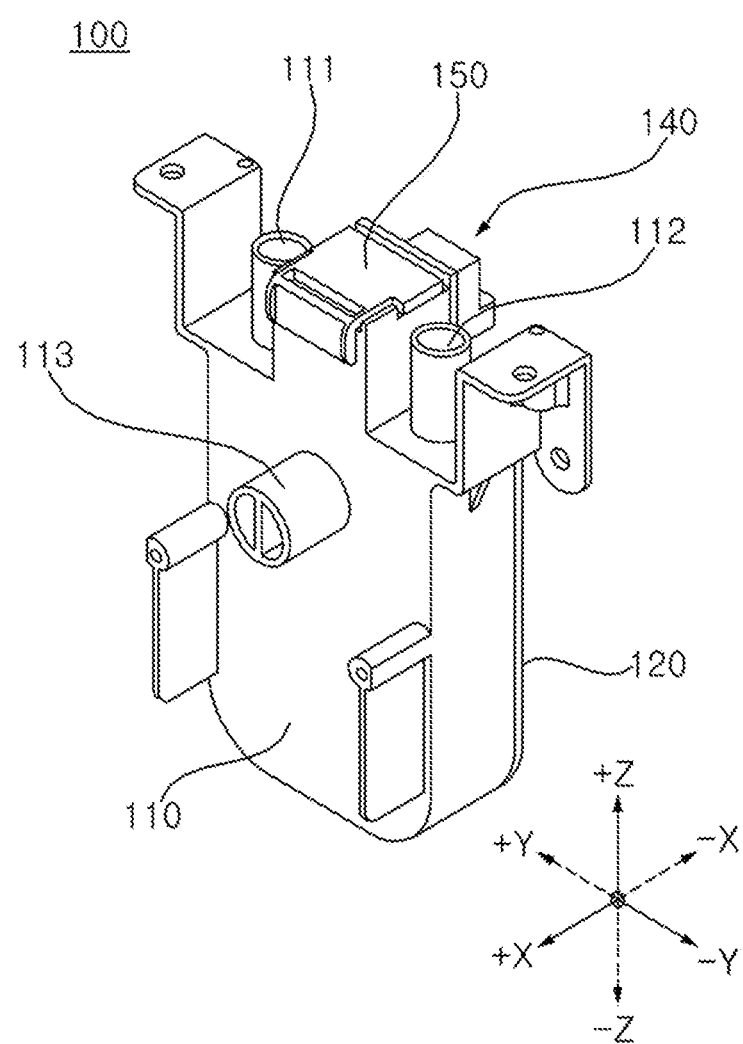
FIG. 3 is a perspective view of a condensate water trap for a gas furnace according to an exemplary embodiment of the present disclosure, when viewed from a first direction.
Figure 4:
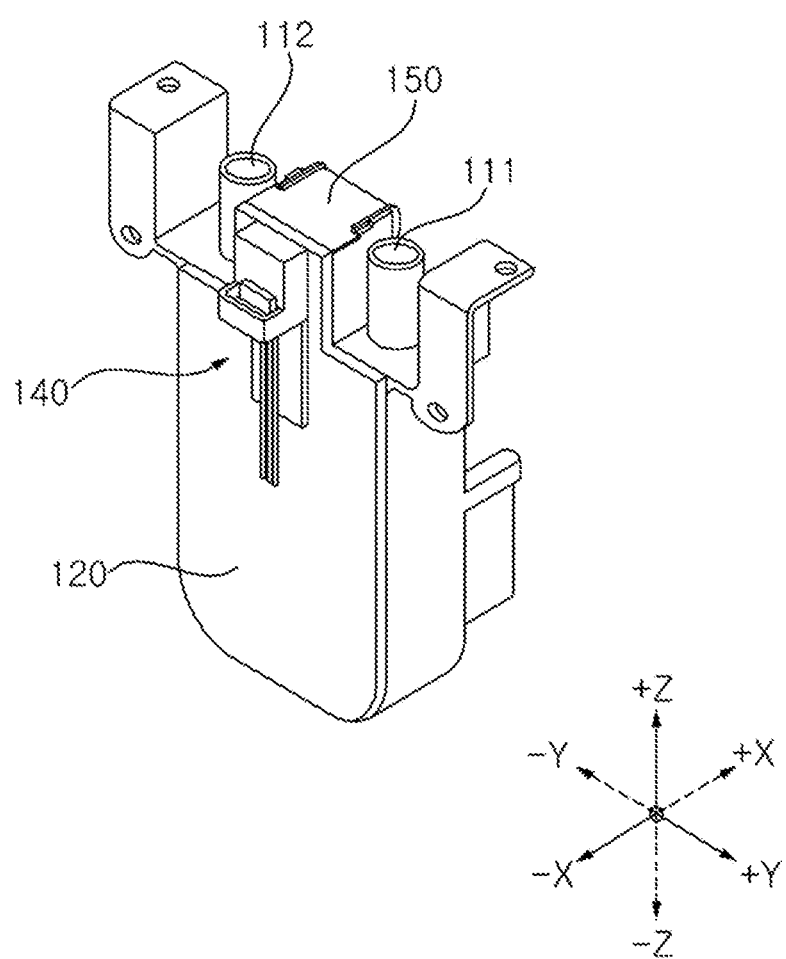
FIG. 4 is a perspective view of the condensate water trap for the gas furnace according to the exemplary embodiment of the present disclosure, when viewed from a second direction opposite to the first direction.

FIG. 3 is a perspective view of a condensate water trap for a gas furnace according to an exemplary embodiment of the present disclosure, when viewed from a first direction (i.e., −X axis direction). FIG. 4 is a perspective view of the condensate water trap for the gas furnace according to the exemplary embodiment of the present disclosure, when viewed from a second direction (i.e., +X axis direction).

Referring to FIGS. 3 and 4, the condensate water trap 100 may include a trap body 110 and a trap cover 120. In an example, the condensate water trap 100 may be installed on one side of the gas furnace 1 via a plurality of connecting members on the trap body 110.

The trap body 110 may have a first inlet 111 through which the condensate water produced in the heat exchanger 5 is introduced, and a second inlet 112 through which the condensate water produced in the exhaust pipe 7 is introduced. Moreover, the trap body 110 may have an outlet 113 through which the condensate water introduced through the first and second inlets 111 and 112 is discharged. In addition, a drainage pipe may be connected to the outlet 113 to discharge the condensate water passed through the outlet 113.

Figure 5:
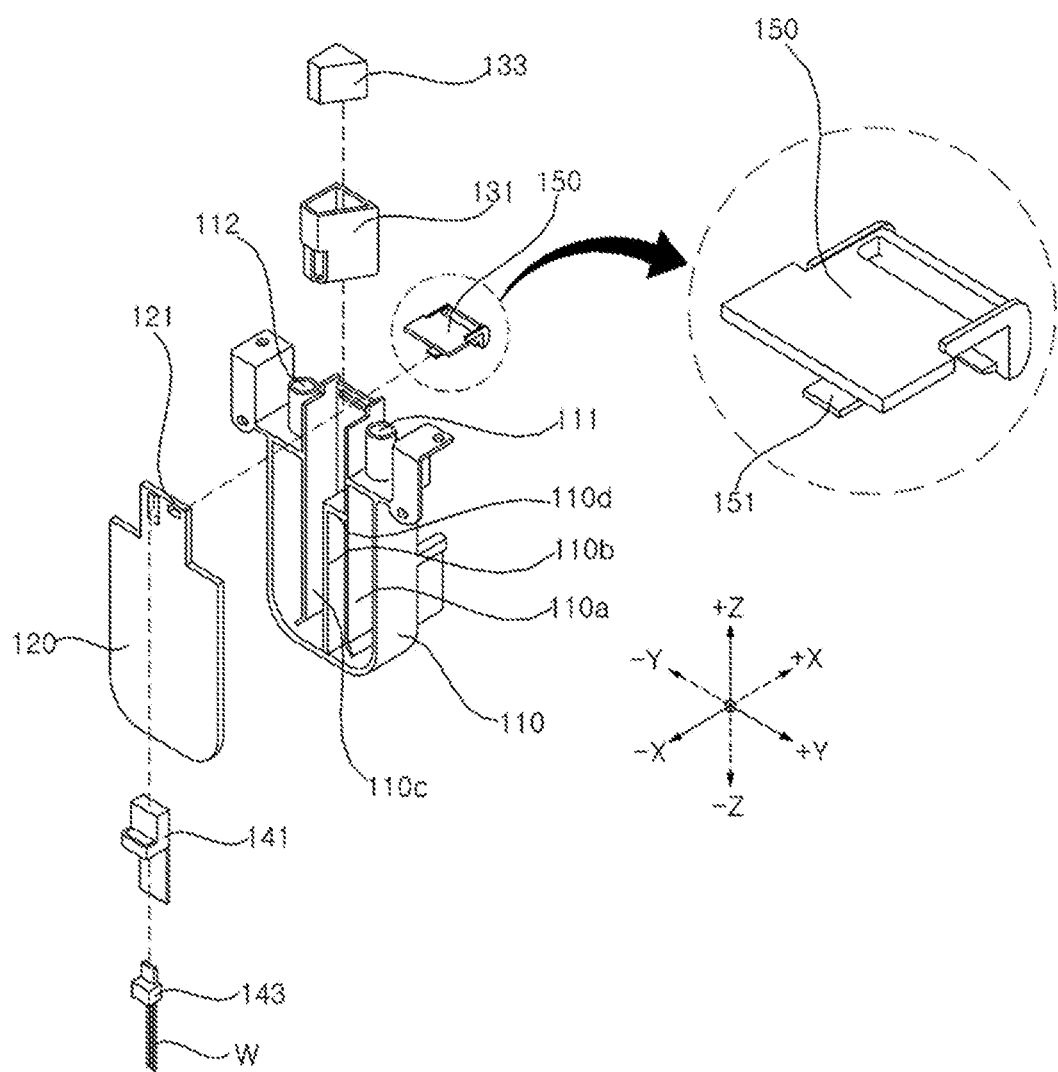
FIG. 5 is an exploded perspective view of the condensate water trap for the gas furnace illustrated in FIG. 4.

FIG. 5 is an exploded perspective view of the condensate water trap for the gas furnace illustrated in FIG. 4.

Referring to FIG. 5, the condensate water trap 100 includes a first flow path through which the condensate water coming from the first inlet 111 passes and a second flow path through which the condensate water coming from the second inlet 112 passes.

Furthermore, the condensate water trap 100 includes a third flow path into which the condensate water (hereinafter, residual condensate water) passed through at least one of the first and second flow paths but not discharged through the outlet 113 is introduced. That is, if a pipe blockage occurs due to foreign material clogging the drainage pipe, the condensate water collected in the condensate water trap 100 may not be discharged through the outlet 113, in which case the stagnating condensate water may enter the third flow path.

In an example, the first, second, and third flow paths may be formed between the trap body 110 and the trap cover 120. More specifically, the trap body 110 may have first, second, and third partition walls 110a, 110b, and 110c that extend in the Z-axis direction in an internal space defined by an outer sidewall forming the exterior and sections off the first, second, and third flow paths.

The first flow path may include a flow path that is formed between a +Y-axial outer sidewall and the first partition wall 110a and guides the flow of the condensate water coming from the first inlet 111 along the −Z axis. Moreover, the first flow path may include a flow path that is formed between the first partition wall 110a and the second partition wall 110b and guides the flow of the condensate water coming from the first inlet 111 along the +Z axis. To this end, the first partition wall 110a may be spaced a predetermined distance apart from a −Z-axial outer sidewall of the trap body 110 so that the direction of condensate water flow changes from the −Z-axis direction to the +Z-axis direction.

The condensate water passed through the first flow path may be discharged in the +X axis direction through the outlet 113 formed below a +Z axial end of the second partition wall 110b (see FIGS. 3 and 8).

The second flow path may include a flow path that is formed between a −Y-axial outer sidewall and the third partition wall 110c and guides the flow of the condensate water coming from the second inlet 112 along the −Z axis. Moreover, the second flow path may include a flow path that is formed between the third partition wall 110c and the second partition wall 110b and guides the flow of the condensate water coming from the second inlet 112 along the +Z axis. To this end, the third partition wall 110c may be spaced a predetermined distance apart from the −Z-axial outer sidewall of the trap body 110 so that the direction of condensate water flow changes from the −Z-axis direction to the +Z-axis direction.

The condensate water passed through the second flow path may be discharged in the +X-axis direction through the outlet 113 formed below the +Z axial end of the second partition wall 110b (see FIGS. 3 and 8).

The third flow path may be formed above the +Z axial end of the second partition wall 110b. That is, the condensate water (hereinafter, residual condensate water) passed through at least one of the first and second flow paths but not discharged through the outlet 113 may build up in a space formed above the outlet 113, and the third flow path may guide the flow of the residual condensate water to the space.

As described later, the third flow path may communicate not with the first flow path but with the second flow path, because of a fourth partition wall 110d supporting a float housing 131, but the present disclosure is not limited to this. In this case, the residual condensate water is condensate water that is passed through the second flow path but not discharged through the outlet 113.

Figure 6:
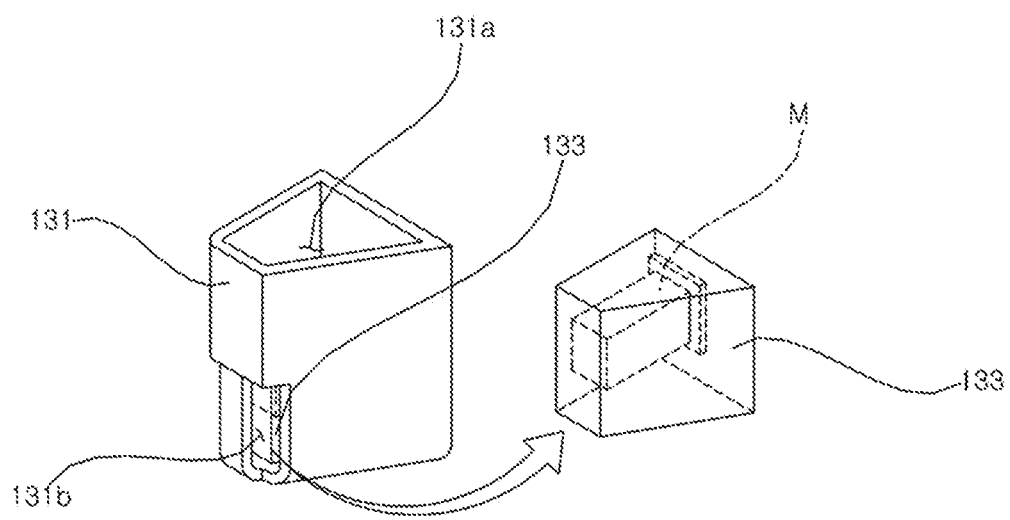
FIG. 6 is a perspective view of a float housing and float provided in the condensate water trap for the gas furnace according to the exemplary embodiment of the present disclosure.
Figure 7:
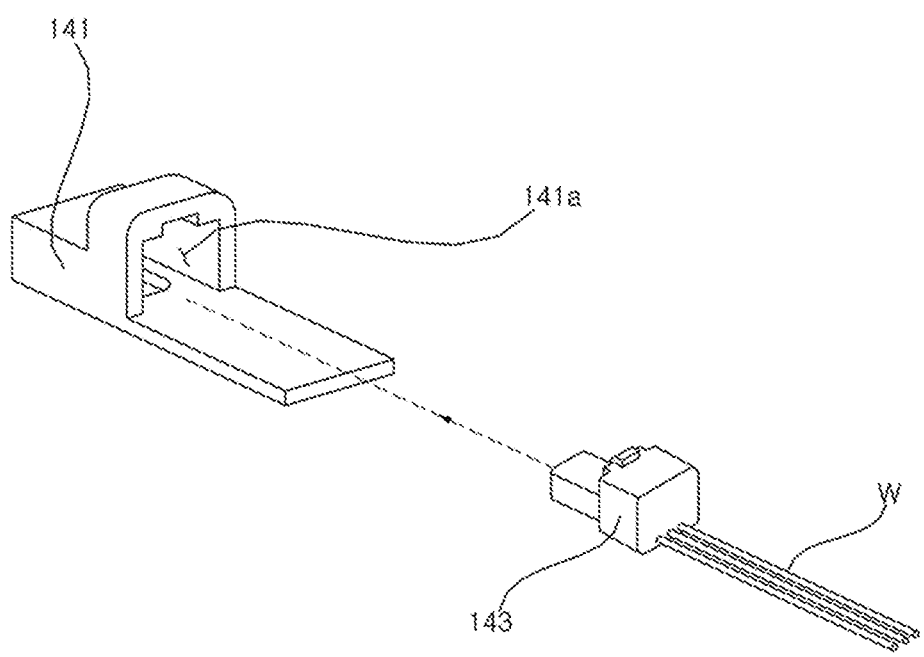
FIG. 7 is an exploded perspective view of a sensor provided in the condensate water trap for the gas furnace according to the exemplary embodiment of the present disclosure.

FIG. 6 is a perspective view of a float housing and float provided in the condensate water trap for the gas furnace according to the exemplary embodiment of the present disclosure. FIG. 7 is an exploded perspective view of a sensor provided in the condensate water trap for the gas furnace according to the exemplary embodiment of the present disclosure. FIG. 8 is a view of a trap body and trap cover of the condensate water trap for the gas furnace according to the exemplary embodiment of the present disclosure, when viewed from one side.

Referring to FIGS. 5 to 8, the condensate water trap 100 includes a sensing mechanism 131, 133, 141, and 143 (S). The sensing mechanism S senses if the amount of residual condensate water introduced into the third flow path is greater than or equal to a given amount. The sensing mechanism S may include a float housing 131, a float 133, and a sensor 141 and 143.

Referring to FIG. 5, at least part of the underside of the float housing 131 may come into contact with the fourth partition wall 110d extending in the Y-axis direction to connect the first and second partition walls 110a and 110b at the +Z axial end of the second partition wall 110b. That is, when the float housing 131 is installed on the condensate water trap 100 via the third flow path, the fourth partition wall 110d may support the float housing 131.

The float housing 131 may be configured to be surrounded by the trap body 110, the trap cover 120, and a plurality of partition walls. Moreover, the float housing 131 may be formed in such a way that a surface (hereinafter, side end surface) extending between a surface (hereinafter, rear end surface) contacting the trap cover 120 and a surface (hereinafter, front end surface) opposite to the rear end surface and contacting the trap body 110 forms an acute angle with the front end surface and an obtuse angle with the rear end surface. As a result, the residual condensate water may smoothly enter the float housing 131 through a space formed between the side end surface and the trap body 110 or a sidewall. Moreover, the float housing 131 may be easily attached to or detached from the trap body 110, as compared to when the side end surface is firmly attached to the trap body 110 or a sidewall.

Referring to FIGS. 5 and 6, the float housing 131 may have a housing hole 131b formed in one side through which the residual condensate water passes. Moreover, an orifice 131a may be formed at the top of the float housing 131. The orifice 131a may be closed by a trap cap 150. The trap cap 150 and the trap cover 120 may be attached together when an insertion projection 151 protruding from one side of the trap cap 150 is inserted into an insertion slot 121 formed in the trap cover 120. Also, the trap cap 150 and the trap body 110 may be attached together when a snap projection protruding from one side of the trap cap 150 snap-fits into a snap groove formed in the trap body 110. As such, the trap cap 150 may mediate the attachment of the trap body 110 and the trap cover 120.

The float 133 may be accommodated inside the float housing 131 and float when the residual condensate water enters the float housing 131 through the housing hole 131b. In this instance, the housing hole 131b may be formed in such a way that at least part of the underside of the float 133 is exposed out of the float housing 131. As a result, the float 133 may float smoothly when the residual condensate water enters the float housing 131 through the housing hole 131b.

A lower outside surface of the float 133 may make contact with a lower inside surface of the float 131, and, when the residual condensate water enters the float housing 131, the float 133 may float a predetermined height from the lower inside surface of the float housing 131. In this instance, the float housing 131 may be formed at a height corresponding to a set floating trajectory for the float 133, and at least part of the inside surface may correspond in shape to the outside surface of the float 133, thereby guiding the floating of the float 133.

Figure 8:
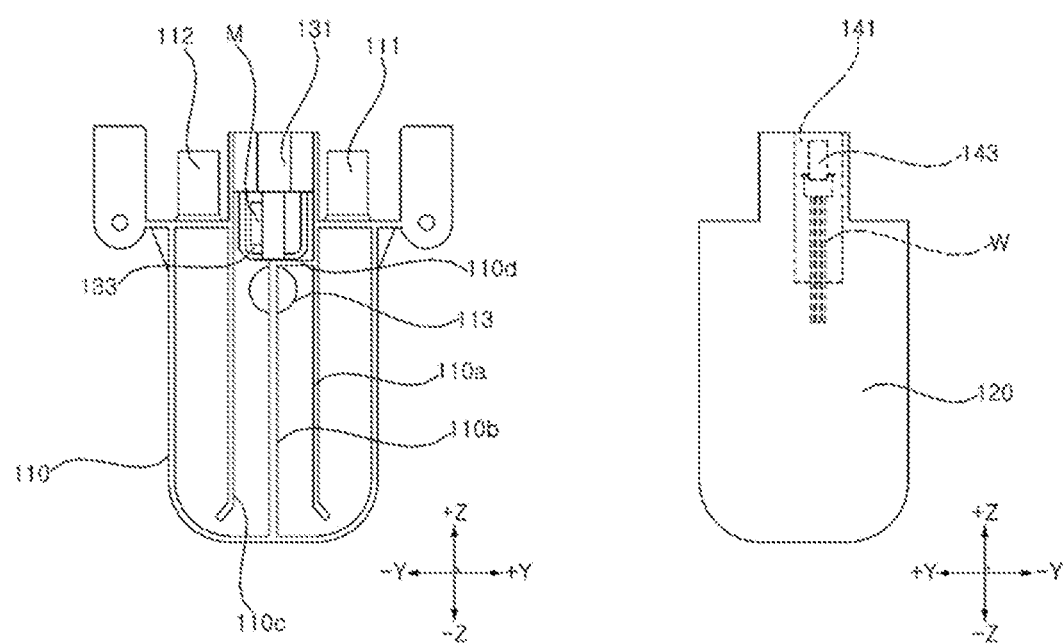
FIG. 8 is a view of a trap body and trap cover of the condensate water trap for the gas furnace according to the exemplary embodiment of the present disclosure, when viewed from one side.

Referring to FIGS. 5, 7, and 8, the sensor 141 and 143 may be attached to an outside surface of the trap cover 120 so as to face the float housing 131 in at least one region, with the trap cover 120 in between. More specifically, the sensor housing 141 may be detachably attached to an outside surface of the trap cover 120 through a coupling hole formed in the trap cover 120, and the sensor body 143 may be inserted into the sensor housing 141 to send certain information (i.e., information about if the amount of residual condensate water introduced into the third flow path is greater than or equal to a given amount) to a person in the room by wired transmission or wireless transmission.

The sensor 141 and 143 or the sensor body 143 may sense if the float 133 is floating at a set detection height. In an example, the sensor body 143 may sense if the float 133 is floating at a set detection height by sensing how the magnetic flux of the float 133 changes with position. To this end, the float 133 may have a magnet M on the inside (see FIG. 6), and the sensor body 143 may be mounted in a position corresponding to the set detection height and sense changes in magnetic flux.

When the sensor body 143 senses that the float 133 is floating at the set detection height, the person in the room can find out that the condensate water collected in the condensate water trap 100 is stopped from escaping through the outlet 113 due to blockage of the drainage pipe, and can have the foreign material clogging the drainage pipe removed or have the drainage pipe replaced or repaired.

In the above, a condensate water trap for a gas furnace according to an exemplary embodiment of the present disclosure has been described with reference to the accompanying drawings. However, the present disclosure is not limited to the above embodiments, and it will be apparent to those skilled in the art that various modifications or implementations within the equivalent scopes can be made without departing from the subject matter of the present disclosure.

The present disclosure provides one or more of the following advantages.

Firstly, it is possible to sense if condensate water produced in at least one or both of the heat exchanger and the exhaust pipe but not discharged through the outlet is stagnating and stopped from escaping, by means of a sensing mechanism installed on a flow path into which the condensate water is introduced.

Secondly, it is possible to simplify the construction for sensing condensate water stagnating and stopped from escaping, because the float is configured to float when there is condensate water produced in at least one or both of the heat exchanger and the exhaust pipe but not discharged through the outlet, and the sensor senses the degree of floating of the float.

What is claimed is:

1. A condensate water trap for a gas furnace that collects and discharges condensate water produced in a heat exchanger and an exhaust pipe, the condensate water trap comprising:
    a first inlet through which the condensate water produced in the heat exchanger is introduced;
    a second inlet through which the condensate water produced in the exhaust pipe is introduced;
    a first flow path through which the condensate water coming from the first inlet passes;
    a second flow path through which the condensate water coming from the second inlet passes;
    an outlet through which the condensate water introduced through the first and second inlets is discharged;
    a third flow path into which the residual condensate water passed through at least one of the first and second flow paths but not discharged through the outlet is introduced;
    a sensing module that senses if an amount of residual condensate water introduced into the third flow path is greater than or equal to a given amount;
    a trap body having the first and second inlets and the outlet formed therein; and
    a trap cover attached to the trap body and forming the first, second, and third flow paths formed between the trap cover and the trap body.

2. The condensate water trap of claim 1, wherein the sensing module further comprises:
    a float housing disposed on the third flow path and having a housing hole formed in one side through which the residual condensate water passes;
    a float accommodated inside of the float housing and configured to float when the residual condensate water enters the float housing through the housing hole; and
    a sensor that senses a degree of floating of the float.

3. The condensate water trap of claim 2, wherein at least a portion of an underside of the float housing comes into contact with a partition wall formed on the trap body.

4. The condensate water trap of claim 3, wherein the float housing is configured to be surrounded by the trap body, the trap cover, and the partition wall.

5. The condensate water trap of claim 2, wherein a lower outside surface of the float makes contact with a lower inside surface of the float, and when the residual condensate water enters the float housing, the float floats a predetermined height from the lower inside surface of the float housing.

6. The condensate water trap of claim 5, wherein the float housing is formed at a height corresponding to a set floating trajectory for the float, and at least a portion of the inside surface corresponds in shape to the outside surface of the float, thereby guiding the floating of the float.

7. The condensate water trap of claim 5, wherein the float housing is formed in such a way that a side end surface extending between a rear end surface contacting the trap cover and a front end surface opposite to the rear end surface and contacting the trap body forms an acute angle with the front end surface and an obtuse angle with the rear end surface.

8. The condensate water trap of claim 2, wherein the housing hole is formed in such a way that at least a portion of an underside of the float is exposed out of the float housing.

9. The condensate water trap of claim 2, wherein the sensor is attached to an outside surface of the trap cover so as to face the float housing in at least one region, with the trap cover in between, and senses if the float is floating at a set detection height.

10. The condensate water trap of claim 2, wherein the float includes a magnet on an inside thereof, and the sensor senses if the float is floating at a set detection height by sensing how a magnetic flux of the float changes with position.

11. The condensate water trap of claim 10, further comprising a trap cap that closes an orifice formed at a top of the float housing and mediates attachment of the trap body and the trap cover.

* * * * *